April 24, 1962
T. L. MORRIS
3,030,903
WELDING JIG
Filed July 6, 1959
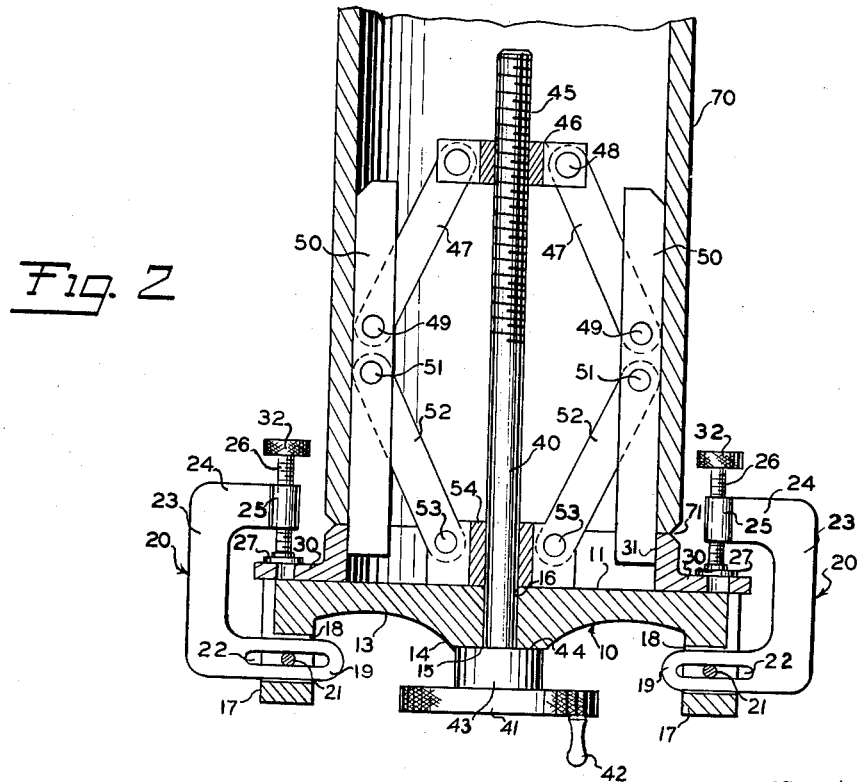
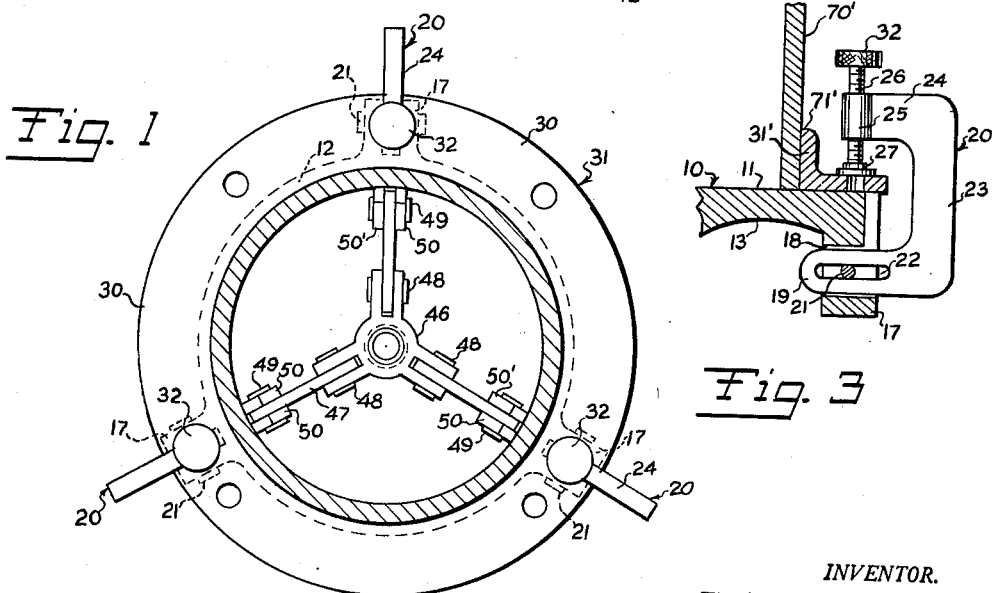
INVENTOR.
THOMAS L. MORRIS
BY
ATTORNEY United States Patent Office 3,030,903
Patented Apr. 24, 1962

3,030,903
WELDING JIG
Thomas L. Morris, 1712 Columbia Drive, Decatur, Ga.
Filed July 6, 1959, Ser. No. 825,243
7 Claims. (Cl. 113—102)

This invention relates to a welding jig and is more particularly concerned with a clamping device for holding, in alignment with a pipe, either a slip-on type pipe flange or an end-to-end type pipe flange.

In the past many devices have been devised to align a flange with a pipe and to hold the same in such alignment as it is welded to the end of the pipe. Usually these prior art devices have been for either slip-on collar type flanges or for end-to-end abutting flanges and no device, to my knowledge, heretofore has been designed specifically to serve both functions equally well. Also, the prior art devices do not have any way of positively locking the take-up stud in place when the device is properly positioned in place. Further, such prior art devices have usually been suitable for use only if the end of the pipe, to which the flange is to be attached, has been squared.

With these problems in mind, I have devised a welding jig which is inexpensive to manufacture and yet may be employed equally well to hold both a slip-on type flange and an end-to-end abutting flange in relation to the end of the pipe. Also, my device tends to lock in place when it is in position and is capable of holding a flange to be welded to a pipe, the end of which has not been squared. Briefly, the mechanism for accomplishing these functions includes a flange holding plate having means for holding the flange in a fixed position thereon and a centrally located take-up stud or shaft provided with a crank handle, the take-up stud being journalled by the holding plate for both axial and rotational movement. This take-up stud projects outwardly of the plate, so as to slidably carry a sleeve normally adjacent the plate. This sleeve is provided with pivoted radial arms diverging from the sleeve and connected at their extremities with pivoted jaw members. Other radial arms, having substantially the same respective outer pivot points as the previously described radial arms, radially converge toward, and are pivotally carried by, a take-up nut threadedly carried by the take-up stud.

Accordingly, it is an object of the present invention to provide a welding jig which is adapted to hold either an end-to-end or a slip-on type flange adjacent the end of a pipe for tack welding thereon.

Another object of my invention is to provide a welding jig which may be substantially locked in place while holding a flange on the end of a pipe and may be easily and simply unlocked when desired.

Another object of my invention is to provide a welding jig of the character previously described which will fit several sizes of pipes.

Another object of my invention is to provide a welding jig which will automatically adjust itself for alignment with the non-squared end of a pipe.

Another object of my invention is to provide a welding jig which is inexpensive to manufacture, durable in construction, easy to operate and efficient in use.

Other and further objects, features and advantages of the present invention will become apparent from the following description when taken in conjunction with the accompanying drawings wherein like characters of reference designate corresponding parts throughout the several views and wherein:

FIG. 1 is a top view of the welding jig constructed in accordance with the present invention annd holding an end-to-end abutting flange in a position to be welded to the end of a pipe.

FIG. 2 is an aligned cross sectional view of the device shown in FIG. 1.

FIG. 3 is a detail fragmentary section showing a portion of my welding jig holding a slip-on or collar-type flange.

Referring now in detail to the embodiment chosen for purpose of illustrating the present invention, it being understood that the present invention in its broadest aspect is not limited to the specific details herein disclosed, numeral 10 denotes a flange holding plate which is disk shaped, having a flat inner surface 11 and a cylindrical side wall 12. The outer surface 13 of the holding plate 10 is annularly concaved to provide a raised central area 14 with a flat circular surface 15. The plate 10 is provided with a central bore 16.

Extending radially outwardly from wall 12 and spaced 120° apart from one another are three substantially identical clamp carrying members 17, each having a protruding portion extending outwardly in an axial direction from the outer surface 13 of holding plate 10. These protruding portions have radial slots 18 which receive radially slidable arms 19 of C-clamps 20. The arms 19 are slidably retained within the slots 18 by pins 21 received in appropriate apertures through the clamp carrying members 17, the pins 21 passing, tangentially with respect to plate 10, through elongated slots 22 in arms 19. Thus it is seen that the arms 19 may be moved radially inwardly and outwardly with respect to the carrying members 17, the movement, however, being limited by the length of slots 22. The C-clamps 20 have body portions 23 which extend in axial directions parallel to the side wall 12 and beyond the plane of the inner surface 11 to terminate in inwardly directed screw carrying arms 24.

The inner ends of arms 24 are provided with heads 25 which threadedly carry clamping bolts 26. The bolts are provided at their inner ends with swivelly mounted circular feet 27 adapted to clamp the flanged peripheral shoulder 30 of a conventional pipe flange 31 inwardly against the surface 11 of holding plate 10. The outer ends of bolts 26 are provided with knurled knobs 32 for rotating bolts 26 individually.

It is now seen that a pipe flange, such as flange 31 or flange 31' as seen in FIG. 3, may be placed on the surface 11 of flange holding plate 10 and the C-clamps 20 adjusted so as to hold firmly the flange against the plate 10.

Passing through the central bore 16 of the plate 10 is a take-up stud or shaft 40 having a circular crank 41 at its outer end, provided with an eccentrically mounted crank handle 42. The circular crank 40 is provided with a hub 43 having an inner surface 44 adapted to abut surface 15 of holding plate 10. The shaft 40 is both slidable and rotatable within the bore 16.

The other end of shaft 40 is provided with external threads 45 which threadedly engage an internally threaded take-up nut 46. A plurality of three radially spaced arms 47 are pivotally connected by their ends to nut 46, there being provided pivot pins 48 in nut 46 around which the radial arms 47 are adapted to pivot. The arms 47 normally extend in a diverging manner toward holding plate 10, their ends being provided with holes receiving pivot pins 49. The pivot pins 49 are carried between pairs of long, aligned rectangular jaw members 50, 50'.

It will be seen that the pivot pins 49 are located centrally of the ends of the jaw members 50, 50' and that other pivot pins 51 are positioned closely adjacent thereto. These latter pivot pins 51 carry between the spaced jaw members 50, 50' the ends of converging radial arms 52. These radial arms 52 are about the same length and are aligned in an axial direction with radial arms 47. The other ends of radial arms 52 are provided with holes receiving pivot pins 53 carried by a sleeve 54 slidably positioned on the shaft 40 adjacent surface 11 of the flange holding plate 10.

In some instances it may be found desirable to combine pivot pins 49 and 51, thereby providing only a single point about which the jaw members 50, 50' must pivot. In such instances the single pivot pin will journal the ends of both arms 47 and 52.

From the foregoing description the operation of my welding jig should be apparent. First, the C-clamps 20 are moved outwardly and a circular flange, such as flange 31, is placed concentrically on the inner surface 11 of flange holding plate 10. The C-clamps 20 are then moved inwardly so that the feet 27 of the bolts 26 overlap the flanged portion 30 of flange 31. Thereafter the bolts 26 are rotated, moving the feet 27 inwardly to clamp the flanged portion 30 between the inner surface 11 and feet 27.

Next the crank 41 is manipulated so as to advance nut 46 along threads 45 until the distance between shaft 40 and jaw members 50, 50' is less than the radius of the pipe, such as pipe 70, to which the flange 31 is to be affixed. The jaw members 50, 50' are then inserted within the pipe 70 until the edge of flange 31 abuts the end of the pipe 70 such as shown in FIG. 2.

Crank 41 is again manipulated so as to rotate shaft 40 and move the nut 46 inwardly toward holding plate 10. This, in turn, urges sleeve 54 against surface 11 of flange holding plate 10, and continued rotation of shaft 40 causes the radial arms 47 and 52 to act as toggle joints to urge the jaw members 50, 50' outwardly against the inner periphery of pipe 70.

Since all the movement at this stage taking place in an axial direction is the movement of nut 46 toward holding plate 10, there is a tendency for the flange 31 and the pipe 70 to be urged toward each other to form a firm end-to-end junction as at numeral 71. Further, since there is equal movement radially of arms 47 and 52 of the respective toggle assemblies, the shaft 40 is positioned generally on the axis of pipe 70.

It is to be remembered, however, that since the pivot pins 49 and 51 are close together or coincide, each pair of jaw members 50, 50' aligns themselves against the inner periphery of the pipe and hence even though the end of pipe 70 has not been squared, there is a tendency as holding plate 10 is drawn toward nut 46 for the abutment edge of flange 31 to align itself with the abutment edge or end of pipe 70. Of course if the flange 31 and the pipe 70 do not come into coaxial alignment, the bolts 26 may be loosened to permit manual repositioning of flange 31 radially.

As my welding jig becomes positioned, there is a definite feel to the crank 41 of tightness because the holding plate 10 is sandwiched in vise-like fashion between the inner surface of sleeve 54 and surface 44 of hub 43. Thus, it is seen that my welding jig is frictionally locked in the tightened position.

It will also be observed that there is no need for close tolerances between bore 16 and shaft 40 or between sleeve 54 and shaft 40; indeed, my machine functions best when the shaft 40 is rather loosely journalled by these members.

Referring now to FIG. 3, it will be observed that my welding jig functions equally well for collar type or slip-on type flanges, such as flange 31', wherein the inner periphery of flange 31' overlaps the outer periphery of pipe 70' to form a weldable joint at numeral 71'. In such instances, my welding jig functions as above described; hence, there is no need for additional explanation, except to state that the flange 31' should be first positioned on pipe 70', as shown in FIG. 3. Next, the flange portions of flange 31' are clamped by bolts 26 and thereafter, the crank 41 manipulated to urge the jaw members 50, 50' against the inner periphery of pipe 70'.

When the flange 31 or 31' is held by my welding jig in proper relationship to pipe 70 or 70', the flange 31 or 31' may be tack welded to the pipe 70 or 70' at numerals 71 or 71'. Usually it is preferable to tack weld at intermediate places between adjacent C-clamps 20. After tack welding, my welding jig may be removed and the flange 31 or 31' and pipe 70 or 70' welded around the entire circumference at numerals 71 or 71'.

It will be obvious to those skilled in the art that many variations may be made in the embodiments chosen for purpose of illustrating the present invention without departing from the scope of my invention as defined by the appended claims.

I claim:

1. A welding jig for holding a flange in place with respect to the end of a pipe comprising a flange holding plate having a flat inner surface and an outer surface, there being provided a bore through said holding plate, radially spaced clamp carrying members extending from said holding plate, clamping means movably carried by said carrying members, the body portions of said clamping means extending generally around the side wall of said holding plate and terminating beyond said inner surface of said holding plate for removably receiving said flange against said inner surface of said holding plate, a take-up shaft extending through said bore of said holding plate, a crank on one end of said take-up shaft outwardly of said outer surface of said holding plate, there being provided external threads on the opposite end of said take-up shaft spaced from said inner surface of said holding plate, a nut carried by said take-up shaft over said threads of said take-up shaft, said nut having internal threads engaging the external threads of said take-up shaft, a sleeve freely slidably carried by said take-up shaft between said nut and said inner surface of said holding plate, first radial arms extending from said nut in diverging fashion toward said holding plate, other radial arms extending from said sleeve in diverging fashion away from said holding plate, said first radial arms being pivotally connected to said nut, said other radial arms being pivotally connected to said sleeve, and elongated jaw members carried by said radial arms for engagement with the inner periphery of said pipe, said sleeve being so positioned on said shaft that said sleeve and said crank frictionally engage said plate when said jaw members engage the inner periphery of said pipe.

2. A welding jig for holding a flange in place with respect to a pipe comprising a flange holding plate having a flat inner surface and an outer surface, there being provided a bore through the central portion of said holding plate, radially spaced clamp carrying members extending from said holding plate, said carrying members being provided with radial slots, pins within said carrying members extending across said slots, radially movable arms slidably carried within the slots of said carrying members, there being provided slots within said arms through which said pins project, the body portions of said arms extending generally radially of said holding plate and terminating beyond said inner surface of said holding plate, screw carrying arms connected by said body portion and extending inwardly in spaced relationship to said inner surface of said holding plate, screws carried by said carrying arms and extending toward said inner surface of said holding plate for clamping said flange to said inner surface, a take-up shaft extending through said bore of said holding plate, means for rotating said shaft, there being provided external threads on the opposite end of said take-up shaft spaced from said inner surface of said holding plate, a nut carried by said take-up shaft over said threads of said take-up shaft, said nut having internal threads engaging the external threads of said take-up shaft, and means connected to said nut for engagement with the inner periphery of said pipe.

3. A welding jig comprising a circular flange holding plate having a flat inner surface and an outer surface, there being provided a bore through the central portion of said holding plate, radially spaced clamp carrying members extending from said holding plate, arms carried by said carrying members, screws carried by said arms and projecting toward said inner surface of said holding plate, a take-up shaft slidably projecting through said bore of said holding plate, a crank on one end of said shaft outwardly of said outer surface of said holding plate, there being provided external threads on the opposite end of said take-up shaft spaced from said inner surface of said holding plate, a nut carried by said take-up shaft over said threads of said take-up shaft, said nut having internal threads engaging the external threads of said take-up shaft, a sleeve freely slidably carried by said take-up shaft between said nut and said inner surface of said holding plate, first radial arms extending from said nut in diverging fashion toward said holding plate, other radial arms extending from said sleeve in diverging fashion away from said holding plate, said first radial arms being pivotally connected to said nut, said other radial arms being pivotally connected to said sleeve, and means connected to said radial arms for engaging the inner periphery of a pipe, said sleeve being so positioned that said sleeve and said crank frictionally engage said plate when said last mentioned means engages the inner periphery of said pipe.

4. A welding jig comprising a circular flange holding plate having a flat inner surface and an outer surface, there being provided a bore through the central portion of said holding plate, means for holding a flange on the inner surface of said holding plate, a take-up shaft slidably projecting through said bore of said holding plate, crank means outwardly of said plate on one end of said take-up shaft for rotating said take-up shaft, there being provided external threads on the opposite end of said take-up shaft spaced from said inner surface of said holding plate, a nut carried by said take-up shaft over said threads of said take-up shaft, said nut having internal threads engaging the external threads of said take-up shaft, a sleeve freely slidably carried by said take-up shaft between said nut and said inner surface of said holding plate, first radial arms extending from said nut in diverging fashion toward said holding plate, other radial arms extending from said sleeve in diverging fashion away from said holding plate, said first radial arms being pivotally connected to said nut, said other radial arms being pivotally connected to said sleeve, and means carried by said radial arms for engaging the inner periphery of a pipe, said sleeve being so positioned that said sleeve and said crank means frictionally engage said plate when said means for engaging the inner periphery of a pipe engages the inner periphery of said pipe.

5. A welding jig comprising a flange holding plate having a flat inner surface and an outer surface, there being provided a bore through the central portion of said holding plate, radially movable arms slidably carried within slots in said holding plate, there being provided slots within said arms, pins projecting through the abovesaid slots, body portions connected to said arms and terminating beyond said inner surface of said holding plate, screw carrying arms extending inwardly from said body portions in spaced relationship to said inner surface of said holding plate, screws carried by said screw carrying arms and extending toward said inner surface of said holding plate, a take-up shaft slidably projecting through said bore of said holding plate, means on one end of said take-up shaft for rotating the same, there being provided external threads on the opposite end of said take-up shaft, a nut carried by said take-up shaft over said threads of said take-up shaft, said nut having internal threads engaging the external threads of said take-up shaft, a sleeve freely slidably carried by said take-up shaft between said nut and said inner surface of said holding plate, first radial arms extending from said nut in diverging fashion toward said holding plate, other radial arms extending from said sleeve in diverging fashion away from said holding plate, said first radial arms being pivotally connected to said nut, said other radial arms being pivotally connected to said sleeve, and elongated jaw members pivotally connected at their central portions to the ends of said radial arms.

6. A welding jig comprising a flange holding plate having a flat inner surface and an outer surfaces, there being provided a bore through the central portion of said holding plate, radially spaced clamp carrying members extending from said holding plate, screw holding means radially movably carried by said carrying members and extending around said holding plate to terminate beyond said inner surface of said holding plate, screws carried by said means extending toward the inner surface of said holding plate, a take-up shaft extending through said bore of said holding plate, means on one end of said shaft outwardly of said outer surface of said holding plate for rotating said shaft, there being provided external threads on the opposite end of said take-up shaft spaced from said inner surface of said holding plate, a nut carried by said take-up shaft over said threads of said take-up shaft, said nut having internal threads engaging the external threads of said take-up shaft, a sleeve freely slidably carried by said take-up shaft between said nut and said inner surface of said holding plate, first radial arms extending from said nut in diverging fashion toward said holding plate, other radial arms extending from said sleeve in diverging fashion away from said holding plate, said first radial arms being pivotally connected to said nut, said other radial arms being pivotally connected to said sleeve, and means pivotally connected at the ends of said radial arms for engaging the inner periphery of a pipe.

7. In a welding jig comprising a flange holding plate, a take-up shaft extending through said holding plate, means on one end of said take-up shaft for rotating said take-up shaft, there being provided external threads on the opposite end of said take-up shaft, a nut carried by said take-up shaft over said threads of said take-up shaft, said nut having internal threads engaging the external threads of said take-up shaft, a sleeve freely slidably carried by said take-up shaft between said nut and said holding plate, first radial arms extending from said nut in diverging fashion toward said holding plate, other radial rams extending from said sleeve in diverging fashion away from said holding plate, said first radial arms being pivotally connected to said nut, said other radial arms being pivotally connected to said sleeve, and means pivotally connected at the end of said radial arms for contacting the inner periphery of a pipe, said sleeve said being so positioned as to frictionally engage said plate when said last mentioned means engages the inner periphery of said pipe.

References Cited in the file of this patent

UNITED STATES PATENTS

| | | |
|---|---|---|
| 514,453 | Eisenbraun | Feb. 13, 1894 |
| 2,323,039 | Hill | June 29, 1943 |
| 2,461,517 | Carnevale | Feb. 15, 1949 |
| 2,669,958 | Sweeney | Feb. 23, 1954 |
| 2,767,676 | Johnson et al. | Oct. 23, 1956 |
| 2,767,677 | Johnson et al. | Oct. 23, 1956 |